Patented Dec. 15, 1931

1,837,176

UNITED STATES PATENT OFFICE

WILLIAM P. TER HORST, OF NITRO, WEST VIRGINIA, ASSIGNOR TO THE ELKO CHEMICAL COMPANY, OF NITRO, WEST VIRGINIA, A CORPORATION OF WEST VIRGINIA

PROCESS OF MANUFACTURING TRIARYL PHOSPHATES

No Drawing.    Application filed June 19, 1928.    Serial No. 286,718.

This invention relates to the manufacture of triaryl phosphates and has for its object to provide an improved process whereby these aryl esters may be produced in a state of high purity and in an economical and efficient manner. More specifically the present invention relates to the preparation of triaryl phosphates by an improved process whereby phosphorus oxychloride is added to an aqueous solution of a metallic salt of a phenol, formed by reacting a phenol with a water soluble metallic hydroxide, to which a relatively small proportion of an inert organic solvent was added.

In the preparation of triaryl phosphate as hereinafter described, the organic solvent is added for the purpose of preventing the monochloride of the diaryl phosphate from separating out thereby preventing the reaction with a third molecule of an alkali salt of a phenol to form triaryl phosphate. In the case of the reaction between phosphorus oxychloride and an alkali phenate, if water only is used as a solvent, the monochloride of diphenyl phosphate is produced. In other words, two mols of an alkali phenate react with one mol of phosphorus oxychloride to form one mol of the monochloride of diphenyl phosphate, which being insoluble in water, separates out and the reaction stops. On the addition of a small amount of an organic solvent in which the monochloride of diphenyl phosphate is soluble, a reaction between one mol of the monochloride of diphenyl phosphate and one mol of an alkali phenate takes place with the consequent formation of triphenyl phosphate.

One of the preferred class of compounds, for example, triphenyl phosphate was prepared in the following manner:

Approximately three molecular proportions (282 parts) of phenol were dissolved in an aqueous solution of a caustic alkali, as for example sodium hydroxide preferably in the proportion of 120 parts (3 molecular proportions), dissolved in approximately twice its weight of water. Approximately 150 parts of water were added and then substantially 30 parts of an inert organic solvent, for example xylene, were added. To this solution hereinbefore described, approximately one molecular proportion (153 parts) of phosphorus oxychloride was added with agitation while maintaining a temperature of substantially 0 to 3° C. After the addition of the phosphorus oxychloride was completed, agitation was continued for substantially three hours at a temperature of approximately 0 to 3° C. At the end of the reaction the solid present, containing both triphenyl phosphate and sodium chloride, was separated from the liquid present by any well known means, for example by filtering. The filtrate was extracted with an organic solvent, for example xylene, and the solid residue containing both triphenyl phosphate and sodium chloride crystals was likewise extracted with an organic solvent, for example xylene, to separate the triphenyl phosphate from the inorganic chloride. If desirable or convenient, the solvent extract from the filtrate may be employed to extract the triphenyl phosphate from the hereinbefore mentioned residue. All solvent extracts were combined and the triphenyl phosphate separated therefrom preferably by cooling as for example with an ice-salt freezing mixture and filtering. Any triphenyl phosphate remaining in the filtrate may be isolated in any convenient method, such for example, as by distillation or by concentrating the filtrate, cooling and filtering the precipitated triphenyl phosphate therefrom. If desirable, no attempt need be made to separate portion of phosphorus oxychloride in the filtrate from the first filtration, said filtrate instead being added to a succeeding run of triphenyl phosphate to be made.

Triphenyl phosphate prepared as described has been isolated from the reaction product by other means than that hereinbefore described, as by distillation at reduced pressure. Triphenyl phosphate obtained according to the method described is of an exceptionally high quality as after recrystallization it contains no phenol odor, and does not discolor substantially when exposed for twelve hours in a closed quartz tube to ultra violet light generated by a mercury vapor arc operating on a 110 volt 60 cycle circuit.

The material prepared as described melts at substantially 48.3° C., and contains less than 0.10% free phenol.

The reactions involved in the preparation of triphenyl phosphate by the method described follow:

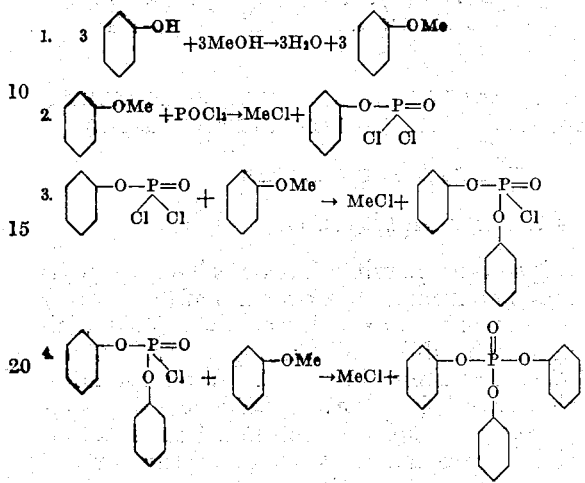

Me in the above equations represents an alkali metal.

Another of the preferred type of compounds, tricresyl phosphate, has been prepared in a manner similar to that described. Thus, approximately three molecular proportions (324 parts) of ortho cresol were dissolved in an aqueous solution of a caustic alkali as for example sodium hydroxide preferably in the proportion of 120 parts (3 molecular proportions) dissolved in approximately twice its weight of water. Approximately 150 parts of water were added and then substantially 30 parts of an inert organic solvent, for example xylene, was added. To this solution, approximately one molecular proportion (153 parts) of phosphorus oxychloride was added with agitation at a temperature of substantially 0 to 3° C. Agitation was then continued for substantially three hours at a temperature of approximately 0 to 3° C. At the end of this period any acid present in the reaction product was neutralized and the material allowed to settle.

The reaction product comprised two liquid layers. The upper layer, containing tricresyl phosphate together with a small amount of organic solvent, was separated and dried with a dehydrating agent, as for example anhydrous sodium sulfate. This dried material has been found to be satisfactory for most purposes. If desirable, however, the solvent impurity may first be eliminated, as for example by distillation at reduced pressure, and the residual liquid then dried as hereinbefore described.

Other metallic hydrates than sodium hydroxide may be used in the preparation of triaryl phosphates according to the process hereinbefore described. Thus, lime may be substituted for sodium hydroxide as shown in the following example:

Approximately three molecular proportions (282 parts) of phenol were dissolved in substantially 1600 parts of water, 92 parts of lime (approximately 10% excess over substantially one and one-half molecular proportions) were added and then substantially 100 parts of an inert organic solvent, for example xylene, added. To this solution hereinbefore described, approximately one molecular proportion (153 parts) of phosphorous oxychloride was added with agitation while maintaining a temperature of substantially 0 to 3° C. After the additional of the phosphorus oxychloride was completed, agitation was continued for substantially three hours at a temperature of approximately 0 to 3° C. On the completion of the reaction, the triphenyl phosphate thus formed was isolated according to the method hereinbefore described.

What is claimed is:

1. A process for the manufacture of a triaryl phosphate comprising the reaction between approximately three molecular proportions of an alkaline-reacting salt of a phenol and approximately one molecular proportion of phosphorus oxychloride in the presence of a substantial quantity of water and a lesser proportion of an organic solvent of any monochloride of a diaryl phosphate thereby produced and inert towards said reacting components.

2. A process for the manufacture of a triaryl phosphate comprising the reaction between approximately three molecular proportions of the sodium salt of a phenol and approximately one molecular proportion of phosphorus oxychloride in the presence of a substantial quantity of water and a lesser proportion of an organic solvent of any monochloride of a diaryl phosphate thereby produced and inert towards said reacting components.

3. A process for the manufacture of a triaryl phosphate comprising the reaction between approximately three molecular proportions of the sodium salt of a phenol and approximately one molecular proportion of phosphorus oxychloride in the presence of a substantial quantity of water and a lesser proportion of an organic hydrocarbon solvent at a temperature of approximately 0 to 3° C.

4. A process for the manufacture of triphenyl phosphate comprising the reaction between approximately three molecular proportions of an alkaline-reacting salt of phenol and approximately one molecular proportion of phosphorus oxychloride in the presence of a substantial quantity of water and a lesser proportion of an organic hydrocarbon solvent.

5. A process for the manufacture of triphenyl phosphate comprising the reaction between approximately three molecular proportions of sodium phenate and aproximately one molecular proportion of phosphorus oxychloride in the presence of a substantial quantity of water and a lesser proportion of an organic hydrocarbon solvent at a temperature of substantially 0 to 3° C.

6. A process for the manufacture of triphenyl phosphate comprising the reaction between approximately three molecular proportions of sodium phenate and approximately one molecular proportion of phosphorus oxychloride in the presence of a substantial quantity of water and a lesser proportion of xylene.

7. A process for the manufacture of triphenyl phosphate comprising the reaction between approximately three molecular proportions of sodium phenate and approximately one molecular proportion of phosphorus oxychloride in the presence of a substantial quantity of water and a lesser proportion of xylene at a temperature of substantially 0 to 3° C.

8. A process for the manufacture of a triaryl phosphate comprising the reaction between approximately three molecular proportions of a salt of a phenol, formed by reacting a metallic water soluble hydrate with a phenol, and approximately one molecular proportion of phosphorus oxychloride in the presence of a substantial quantity of water and a lesser quantity of an organic solvent of any monochloride of a diaryl phosphate thereby produced and inert towards said reacting components.

9. A process for the manufacture of triphenyl phosphate which comprises reacting approximately three molecular proportions of sodium phenate and approximately one molecular proportion of phosphorus oxychloride in the presence of water and a lesser quantity of an organic solvent of an incompletely phenylated phosphate.

10. A process for the manufacture of triphenyl phosphate which comprises reacting approximately three molecular proportions of sodium phenate and approximately one molecular proportion of phosphorus oxychloride in the presence of water and of an organic solvent of a phenylated phosphate immiscible with water.

In testimony whereof I hereunto affix my signature.

WILLIAM P. TER HORST.